(12) United States Patent
Kodama et al.

(10) Patent No.: US 7,283,715 B2
(45) Date of Patent: Oct. 16, 2007

(54) OPTICAL WAVEGUIDE FORMING MATERIAL AND METHOD

(75) Inventors: Kinya Kodama, Gunma-ken (JP); Tsutomu Kashiwagi, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 273 days.

(21) Appl. No.: 10/911,686

(22) Filed: Aug. 5, 2004

(65) Prior Publication Data

US 2005/0025442 A1    Feb. 3, 2005

Related U.S. Application Data

(63) Continuation-in-part of application No. 10/358,187, filed on Feb. 5, 2003, now abandoned.

(30) Foreign Application Priority Data

Feb. 6, 2002  (JP) .............................. 2002-029516

(51) Int. Cl.
*G02B 6/10* (2006.01)
*G02B 6/00* (2006.01)

(52) U.S. Cl. ................ 385/129; 385/130; 385/141; 385/142; 385/143; 385/144; 385/145; 264/1.24

(58) Field of Classification Search ................ 385/129, 385/130–132, 141–145; 264/1.24
See application file for complete search history.

(56) References Cited

U.S. PATENT DOCUMENTS

| | | | |
|---|---|---|---|
| 4,276,135 A | * | 6/1981 | Sato et al. ............... 522/99 |
| 4,568,566 A | * | 2/1986 | Tolentino ................ 427/515 |
| 5,491,203 A | | 2/1996 | Matsui et al. |
| 5,738,976 A | * | 4/1998 | Okinoshima et al. .... 430/285.1 |
| 6,054,502 A | | 4/2000 | Friedlander et al. |

FOREIGN PATENT DOCUMENTS

| | | |
|---|---|---|
| JP | 8-73593 A | 3/1996 |
| JP | 8-311139 A | 11/1996 |
| JP | 2000-180643 A | 6/2000 |
| JP | 3133039 B2 | 11/2000 |
| JP | 2001-33640 A | 2/2001 |
| JP | 2001-59918 A | 3/2001 |

OTHER PUBLICATIONS

Japanese Office Action dispatched on Nov. 15, 2006 in JP 2002-029516.

* cited by examiner

*Primary Examiner*—Brian Healy
*Assistant Examiner*—Charlie Peng
(74) *Attorney, Agent, or Firm*—Birch, Stewart, Kolasch & Birch, LLP

(57) ABSTRACT

An optical waveguide comprising a substrate, a lower clad layer on the substrate, a core layer and an upper clad layer, at least one of the lower clad layer, the core layer and the upper clad layer is formed of a cured product of a photocurable organopolysiloxane composition comprising (A) a (meth)acryloyloxy group-containing organopolysiloxane of the following average compositional formula (1):

$$(CH_2=CR^1COO(CH_2)_n)_a(Ph)_b R^2_c (R^3O)_d SiO_{(4-a-b-c-d)/2} \quad (1)$$

wherein $R^1$ is hydrogen or methyl, $R^2$ is an $C_1$–$C_8$ alkyl or $C_2$–$C_8$ alkenyl group, Ph is phenyl, $R^3$ is hydrogen or an unsubstituted or alkoxy-substituted $C_1$–$C_4$ alkyl group, subscripts a, b, c and d are numbers satisfying: $0.05 \leq a \leq 0.9$, $0.1 \leq b \leq 0.9$, $0 \leq c \leq 0.2$, $0 < d \leq 0.5$, and $0.8 \leq a+b+c+d \leq 1.5$, and n is an integer of 2 to 5, and having a weight average molecular weight of 1,000 to 100,000 as measured by GPC using a polystyrene standard, and (B) a photosensitizer.

19 Claims, No Drawings

OPTICAL WAVEGUIDE FORMING MATERIAL AND METHOD

CROSS-REFERENCE TO RELATED APPLICATION

This application is a continuation-in-part of application Ser. No. 10/358,187 filed on Feb. 5, 2003 now abandoned, the entire contents of which are hereby incorporated by reference.

TECHNICAL FIELD

This invention relates to optical waveguides as optical transmission lines, and more particularly, to optical wave guides formed by using an optical waveguide-forming material in the form of a photo-curable organopolysiloxane composition which forms through application and light exposure a thick-film coating having improved heat resistance and moisture resistance, and a method for preparing such optical waveguides.

BACKGROUND ART

Polysiloxane resins are polymers having advantages including high transparency, heat resistance, and low cost and ease of working as compared with quartz glass and thus considered attractive as a material for forming optical transmission lines such as optical waveguides. However, when thick films are formed from polysiloxane resins, they give rise to several problems including poor crack resistance, a transmission loss and degradation in a humid environment, and cumbersome steps involved in thick film formation.

To solve these problems of polysiloxane resins, JP-A 2001-59918 discloses a technique of preparing an optical waveguide by forming a thick film of a silicone ladder resin to a thickness in excess of 20 μm. The resin used is a thermosetting resin, and the optical waveguide preparing process involves a dry etching step which is cumbersome.

Japanese Patent No. 3,133,039 discloses a technique of directly preparing a core ridge of an optical waveguide simply by forming a coating of a photo-curable silicone oligomer, exposing the coating to light through a mask for effecting photo-crosslinking, and washing away the masked or unreacted portion of the coating with a suitable solvent. This optical waveguide-forming material is characterized by a siloxane oligomer with which a molecule having a photo-polymerizable group is admixed, but not an oligomer having photo-polymerizable groups directly bonded to silicon atoms through covalent bonds.

As a general rule, plastic based optical materials including polysiloxanes experience a propagation loss of light by moisture absorption in a humid environment. JP-A 2001-33640 solves this problem by covering a clad layer of an optical waveguide with an amorphous fluororesin layer. This does not impart moisture resistance to the resins of which the core and clad layers are formed. JP-A 08-311139 corresponding to U.S. Pat. No. 5,738,976 discloses a photo-curable organopolysiloxane composition comprising an acrylic functional organopolysiloxane resin which does not possess any functional group such as alkoxy or hydroxyl group in the molecule, that is, is terminated with a triorganosiloxy group, and is thus inferior in adhesion to the substrate or the like under heating conditions. No reference is made to the refractive index which is an important factor as the optical waveguide-forming material.

Therefore, there is a need to have a technique capable of fabricating in a simple and commercially advantageous manner an optical waveguide of quality as an optical transmission line, having a thick-film coating which is improved in heat resistance, moisture resistance, and adhesion to substrate.

SUMMARY OF THE INVENTION

An object of the present invention is to provide an optical waveguide formed by using a photo-curable organopolysiloxane composition which is improved in sensitivity and resolution and can form a thick-film coating having heat resistance, moisture resistance and adhesion; and a practical and commercially advantageous method for preparing an optical waveguide using the same.

Addressing the above concerns, the inventor has found that a (meth)acryloyloxy group-containing organopolysiloxane of the average compositional formula (1) with an average molecular weight of 1,000 to 100,000 as measured by gel permeation chromatography (GPC) using a polystyrene standard is obtainable by subjecting a specific proportion of a (meth)acryloyloxyalkyltrialkoxysilane of formula (2), a phenyltrialkoxysilane of formula (3) and optionally, an organotrialkoxysilane of formula (4) to co-hydrolysis and polycondensation, all the formulae being shown below. This organopolysiloxane has a siloxane skeleton consisting essentially of trifunctional siloxane units (i.e., organosilsesquioxane units) and has photo-polymerizable groups directly attached to silicon atoms through covalent bonds. A photo-curable organopolysiloxane composition comprising the (meth)acryloyloxy group-containing organopolysiloxane of formula (1) and a photo-sensitizer is improved in sensitivity and resolution and can form a thick-film coating having heat resistance and moisture resistance in the cured state. The refractive index can be readily controlled merely by altering the proportion of organic groups (monovalent hydrocarbon groups bonded to silicon atoms such as alkyl, alkenyl and phenyl groups) introduced into the (meth)acryloyloxy group-containing organopolysiloxane. By a photolithographic process including applying the photo-curable organopolysiloxane composition onto a substrate to form a coating and exposing the coating to light for curing, without a need for dry etching, an optical waveguide having a thick-film coating which is resistant to cracks, adherent under heating conditions, and free from quality degradation such as an optical transmission loss in a humid environment can be manufactured in a commercially advantageous manner.

In a first aspect, the invention provides an optical waveguide comprising a substrate, a lower clad layer on the substrate, a core layer on the lower clad layer and an upper clad layer on the core layer, at least one of the lower clad layer, the core layer and the upper clad layer is a cured product of a photo-curable organopolysiloxane composition comprising (A) a (meth)acryloyloxy group-containing organopolysiloxane and (B) a photosensitizer. The organopolysiloxane (A) is of the following average compositional formula (1):

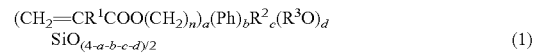

$$(CH_2=CR^1COO(CH_2)_n)_a(Ph)_b R^2_c (R^3O)_d SiO_{(4-a-b-c-d)/2} \qquad (1)$$

wherein $R^1$ is hydrogen or methyl, $R^2$ is an $C_1$–$C_8$ alkyl or $C_2$–$C_8$ alkenyl group, Ph is phenyl, $R^3$ is hydrogen or an unsubstituted or alkoxy-substituted $C_1$–$C_4$ alkyl group, subscripts a, b, c and d are numbers satisfying: $0.05 \leq a \leq 0.9$, $0.1 \leq b \leq 0.9$, $0 \leq c \leq 0.2$, $0 < d \leq 0.5$, and $0.8 \leq a+b+c+d \leq 1.5$, and n is an integer of 2 to 5, and has a weight average molecular weight of 1,000 to 100,000 as measured by GPC using a polystyrene standard.

In a preferred embodiment, the (meth)acryloyloxy group-containing organopolysiloxane (A) is obtained by subjecting to co-hydrolysis and polycondensation a (meth)acryloyloxy-alkyltrialkoxysilane of the general formula (2):

$$CH_2=CR^1COO-(CH_2)_n-Si(OR^4)_3 \quad (2)$$

wherein $R^1$ is hydrogen or methyl, $R^4$ is an unsubstituted or alkoxy-substituted alkyl group, and n is an integer of 2 to 5, 0.2 to 20 moles per mole of the silane of formula (2) of a phenyltrialkoxysilane of the general formula (3):

$$PhSi(OR^5)_3 \quad (3)$$

wherein Ph is phenyl and $R^5$ is an unsubstituted or alkoxy-substituted alkyl group, and 0 to 5 moles per mole of the silane of formula (2) of an organotrialkoxysilane of the general formula (4):

$$R^2Si(OR^6)_3 \quad (4)$$

wherein $R^2$ is an $C_1$–$C_8$ alkyl or $C_2$–$C_8$ alkenyl group and $R^6$ is an unsubstituted or alkoxy-substituted alkyl group.

Preferably, each of the lower clad layer and the core layer is the cured product of the above-described photo-curable organopolysiloxane composition. In this case, the refractive index difference value of $\{(Rf_2-Rf_1)/Rf_2\}\times100$ in which $Rf_2$ is the refractive index of the core layer at 25° C. and $Rf_1$ is the refractive index of the lower clad layer at 25° C. is controlled preferably in a range of from 0.1 to 5%, more preferably from 0.2 to 3.5%. Or, each of the upper clad layer and the core layer is the cured product of the above-described photo-curable organopolysiloxane composition. In this case, the refractive index difference value of $\{(Rf_2-Rf_3)/Rf_2\}\times100$ in which $Rf_2$ is the refractive index of the core layer at 25° C. and $Rf_3$ is the refractive index of the upper clad layer at 25° C. is controlled preferably in a range of from 0.1 to 5%, more preferably from 0.2 to 3.5%. More preferably, each of the lower clad layer, the core layer and the upper clad layer is the cured product of the above-described photo-curable organopolysiloxane composition. In this case, the refractive index difference values of $\{(Rf_2-Rf_1)/Rf_2\}\times100$ and $\{(Rf_2-Rf_3)/Rf_2\}\times100$ are controlled in a range of from 0.1 to 5%, preferably from 0.2 to 3.5%, respectively.

In a second aspect, the invention provides a method of preparing an optical waveguide comprising the steps of forming a lower clad layer on a substrate, forming a core layer on the lower clad layer, and forming an upper clad layer on the core layer so that at least one of the lower clad layer, the core layer and the upper clad layer is formed by irradiating light to the above-described photo-curable organopolysiloxane composition, thereby forming a cured product. In this case, the refractive index difference value defined above is controlled by controlling the phenyl content in component (A) or the (meth)acryloyloxy group-containing organopolysiloxane of formula (1).

DETAILED DESCRIPTION OF THE INVENTION

In the photo-curable organopolysiloxane composition used for preparing the optical waveguide according to the present invention, component (A) is a (meth)acryloyloxy group-containing organopolysiloxane of the following average compositional formula (1), that is, an organopolysiloxane having a branched, three-dimensional network structure and possessing in its molecule a siloxane skeleton consisting essentially of trifunctional siloxane units (i.e., organosilsesquioxane units).

$$(CH_2=CR^1COO(CH_2)_n)_a(Ph)_bR^2_c(R^3O)_d \\ SiO_{(4-a-b-c-d)/2} \quad (1)$$

Herein $R^1$ is hydrogen or methyl, $R^2$ is an $C_1$–$C_8$ alkyl or $C_2$–$C_8$ alkenyl group, Ph is phenyl, $R^3$ is hydrogen or an unsubstituted or alkoxy-substituted $C_1$–$C_4$ alkyl group, subscripts a, b, c and d are numbers satisfying: $0.05 \leq a \leq 0.9$, $0.1 \leq b \leq 0.9$, $0 \leq c \leq 0.2$, $0 < d \leq 0.5$, and $0.8 \leq a+b+c+d \leq 1.5$, and n is an integer of 2 to 5.

More particularly, the substituent group $R^2$ in formula (1) is selected from alkyl groups having 1 to 8 carbon atoms such as methyl, ethyl, propyl, isopropyl, butyl, isobutyl, tert-butyl, pentyl, neopentyl, hexyl, heptyl, cyclohexyl, cycloheptyl, octyl and α-ethylhexyl and alkenyl groups having 2 to 8 carbon atoms such as vinyl, allyl, propenyl, isopropenyl and butenyl. Of these, methyl is most preferred. It is acceptable that some or all of the hydrogen atoms attached to carbon atoms in the foregoing alkyl groups are deuterated.

Examples of the unsubstituted or alkoxy-substituted $C_1$–$C_4$ alkyl group represented by $R^3$ include methyl, ethyl, propyl, isopropyl, butyl, isobutyl, tert-butyl, methoxymethyl, methoxyethyl, ethoxymethyl and ethoxyethyl, with methyl being most preferred. It is acceptable that these alkyl groups are deuterated, preferably per-deuterated.

In formula (1), subscript "a" denotes the proportion of (meth)acryloyloxy groups which play an important role for the composition to become photosensitive, and is a number satisfying $0.05 \leq a \leq 0.9$, and preferably $0.1 \leq a \leq 0.5$. Subscript b denotes the proportion of phenyl groups which impart heat resistance to the cured composition, and is a number satisfying $0.1 \leq b \leq 0.9$, and preferably $0.5 \leq b \leq 0.9$. Subscript c is $0 \leq c \leq 0.2$, and preferably $0 \leq c \leq 0.1$, and d is $0 < d \leq 0.5$, preferably $0 < d \leq 0.1$, and more preferably $0.01 \leq d \leq 0.1$. These subscripts further satisfy $0.8 \leq a+b+c+d \leq 1.5$, and preferably $1 \leq a+b+c+d \leq 1.1$. Subscript n is an integer of 2 to 5, preferably equal to 3.

The (meth)acryloyloxy group-containing organopolysiloxane of formula (1) has a refractive index $n_D$ which can be readily controlled simply by altering the proportion of organic groups (monovalent hydrocarbon groups bonded to silicon atoms such as alkyl, alkenyl and phenyl groups) introduced in the organopolysiloxane. The optical waveguide generally has a difference of refractive index of approximately 0.3% between the core and the clad layer. The refractive index of the organopolysiloxane can be controlled simply by altering the proportion of organic groups (monovalent hydrocarbon groups bonded to silicon atoms such as alkyl, alkenyl and phenyl groups or alkoxy groups bonded to silicon atoms) introduced therein. It is noted that the (meth)acryloyloxy group-containing organopolysiloxane of formula (1) may have a refractive index $n_D$ in the range of 1.47 to 1.55, especially 1.50 to 1.55.

The (meth)acryloyloxy group-containing organopolysiloxane of formula (1) should have a weight, average molecular weight (Mw) of 1,000 to 100,000, preferably 5,000 to 50,000, as measured by GPC using a polystyrene standard. An organopolysiloxane with too low a Mw may fail to form a coating having heat resistance and moisture resistance and hence, to attain the objects of the invention whereas an organopolysiloxane with too high a Mw may lose solvent solubility and have a lower resolution during the manufacture of optical waveguides.

The (meth)acryloyloxy group-containing organopolysiloxane of formula (1) can be prepared by subjecting a (meth)acryloyloxyalkyltrialkoxysilane of the general formula (2):

$$CH_2=CR^1COO-(CH_2)_n-Si(OR^4)_3 \quad (2)$$

wherein $R^1$ and n are as defined above, and $R^4$ is an unsubstituted or alkoxy-substituted alkyl group, a phenyltrialkoxysilane of the general formula (3):

$$PhSi(OR^5)_3 \quad (3)$$

wherein Ph is phenyl and $R^5$ is an unsubstituted or alkoxy-substituted alkyl group, and optionally, an organotrialkoxysilane of the general formula (4):

$$R^2Si(OR^6)_3 \quad (4)$$

wherein $R^2$ is as defined above and $R^6$ is an unsubstituted or alkoxy-substituted alkyl group to co-hydrolysis and polycondensation.

The unsubstituted or alkoxy-substituted alkyl groups represented by $R^4$ in formula (2) are preferably those of 1 to 12 carbon atoms, more preferably 1 to 4 carbon atoms. Examples of unsubstituted alkyl groups and alkoxy-substituted alkyl groups include methyl, ethyl, propyl, isopropyl, butyl, isobutyl, tert-butyl, pentyl, neopentyl, hexyl, heptyl, octyl, nonyl, decyl, dodecyl, methoxymethyl, methoxyethyl, ethoxymethyl, and ethoxyethyl. Of these, methyl is most preferred. For a certain purpose, deuterated alkyl groups may be used.

The unsubstituted or alkoxy-substituted alkyl groups represented by $R^5$ in formula (3) and $R^6$ in formula (4) are as exemplified for the unsubstituted or alkoxy-substituted alkyl groups represented by $R^4$.

Examples of suitable (meth)acryloyloxyalkyltrialkoxysilane having formula (2) include acryloyloxypropyltrimethoxysilane, acryloyloxypropyltriethoxysilane, acryloyloxypropyltripropoxysilane, (2-methyl)acryloyloxypropyltrimethoxysilane, (2-methyl)acryloyloxypropyltriethoxysilane, and acryloyloxypropyltri(methoxyethoxy)silane.

Examples of suitable phenyltrialkoxysilane having formula (3) include phenyltrimethoxysilane, phenyltriethoxysilane, phenyltripropoxysilane, and phenyltributoxysilane.

Examples of suitable organotrialkoxysilane having formula (4) include alkyltrialkoxysilanes such as methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane and propyltributoxysilane; and alkenyltrialkoxysilanes such as vinyltriethoxysilane and vinyltri(methoxyethoxy)silane.

In the preparation method, the (meth)acryloyloxyalkyltrialkoxysilane of formula (2) and the phenyltrialkoxysilane of formula (3) are used in a molar ratio of 1:0.2–20, preferably 1:1–5. They are subjected to co-hydrolytic reaction, preferably in the presence of an acid catalyst, yielding a co-hydrolytic condensate having silanol groups.

If the molar ratio of silane of formula (2) to silane of formula (3) is outside the range, the desired (meth)acryloyloxy group-containing organopolysiloxane of formula (1) is not obtainable.

Further in the preparation method, the organotrialkoxysilane of formula (4) may be used along with the silanes of formulae (2) and (3), if desired. The amount of the organotrialkoxysilane of formula (4) used is 0 to 4 moles, especially 0 to 2 moles per mole of the silane of formula (2). If the amount of silane of formula (4) is too large, the resulting (meth)acryloyloxy group-containing organopolysiloxane of formula (1) has an increased $R^2$ content and may become less resistant to heat and moisture.

Preferably the co-hydrolytic reaction is carried out in the presence of an acid catalyst. The acid catalyst may be any of well-known acid catalysts including inorganic acids and organic acids. Exemplary are inorganic acids such as hydrochloric acid and sulfuric acid, and organic acids such as acetic acid and oxalic acid. Of these, oxalic acid is most preferred. The acid catalyst is preferably used in an amount of 0.1 to 4.0 parts by weight per 100 parts by weight of the alkoxysilanes of formulae (2), (3) and (4) combined. Too small an amount of the acid catalyst may fail to produce a (meth)acryloyloxy group-containing organopolysiloxane of formula (1) having a desired average molecular weight. Co-hydrolysis is generally carried out at 0 to 50° C.

The co-hydrolyzate thus obtained is then subjected to polycondensation. Polycondensation conditions are important in controlling the molecular weight of the organopolysiloxane of formula (1). Preferred polycondensation conditions include a temperature of 70 to 80° C. and a time of 60 minutes or longer, especially 120 to 180 minutes. At too low a temperature or in too short a time, polycondensation reaction may not proceed to the desired extent.

In order to produce an organopolysiloxane having a desired average molecular weight, specifically a Mw of at least 1,000 as measured by GPC using a polystyrene standard, polycondensation should preferably occur between silanol groups resulting from the co-hydrolysis and alkoxy groups left after the co-hydrolysis, under the above-described reaction conditions. In the co-hydrolytic polycondensation product resulting from the co-hydrolysis and ensuing polycondensation, some alkoxy groups are left intact and some silanol groups are left unreacted as well. Due to the essential inclusion of such residual alkoxy groups and/or silanol groups (i,e., hydroxyl groups attached to silicon atoms) in the molecule, an optical waveguide-forming material resulting from curing of the instant composition maintains good adhesion to the substrate or good adhesion between themselves even under heating conditions.

Component (B) in the inventive composition is a photosensitizer. Any of commonly used photosensitizers is acceptable although one having transparency is preferred. Exemplary photosensitizers are benzoyl group-containing compounds such as 2-hydroxy-2-methylpropiophenone, 1-hydroxycyclohexyl phenyl ketone, tetra(tert-butylperoxycoarbonyl)benzophenone, and benzophenone.

The photosensitizer (B) is preferably used in an amount of 0.0001 to 20 parts by weight, more preferably 0.1 to 10 parts by weight, per 100 parts by weight of the (meth)acryloyloxy group-containing organopolysiloxane (A).

In addition to components (A) and (B), the photo-curable organopolysiloxane composition of which the optical waveguide-forming material is constructed according to the present invention may contain a solvent, a polymerization inhibitor such as hydroquinone monomethyl ether or 2,6-di(tert-butyl)-4-methylphenol, and other additives customarily used in conventional photo-curable organopolysiloxane compositions, if desired, and as long as they do not compromise the objects of the invention.

Examples of the solvent used herein include toluene, xylene, methyl isobutyl ketone and 1-methoxy-2-propanol. The solvent is preferably used in an amount of 0 to 80% by weight based on the entire composition.

The photo-curable organopolysiloxane composition of the invention can be prepared by uniformly mixing components (A) and (B) and optionally, other necessary components.

In the present invention, the optical waveguide comprises a substrate, a lower clad layer on the substrate, a core layer on the lower clad layer and an upper clad layer on the core layer.

The substrate used herein may be selected from ceramic substrates, silicon substrates (silicon wafers), glass substrates such as quartz glass substrates, and organic resin substrates such as epoxy resin substrates, acrylic resin substrates, polyimide resin substrates, polycarbonate resin substrates and silicone resin substrates.

In the inventive optical waveguide, at least one of the lower clad layer, the core layer and the upper clad layer is formed from the above-described photo-curable organopolysiloxane composition. Preferably, the lower clad layer and the core layer, or the upper clad layer and the core layer are formed from the above-described photo-curable organopolysiloxane composition. More preferably, all the layers (i.e., the lower clad layer, the core layer and the upper clad layer) are formed from the above-described photo-curable organopolysiloxane composition.

In the present invention, the thickness and the width of the core layer each are preferably 5 to 70 μm, more preferably 10 to 50 μm. The thickness of the lower clad layer and the thickness of the upper clad layer each are preferably 10 to 300 μm, more preferably 20 to 100 μm.

As an optical waveguide-forming material, the photo-curable organopolysiloxane composition of the invention is used in the following manner, for example. The composition is applied to a predetermined substrate using a suitable applicator such as a spinner, and if the composition contains a solvent, the solvent is removed, thus forming a coating. Using a mask aligner or the like, light is irradiated to the coating directly or after the coating surface is shielded with a photomask, whereupon the exposed portions of the coating are cured.

Irradiating light is typically ultraviolet (UV) radiation including deep UV (typical wavelength 193 nm, 253 nm), i-line (wavelength 365 nm), g-line (wavelength 436 nm), and h-line (wavelength 405 nm). The dose of irradiation may be in the range of 20 to 1,000 mJ.

The uncured portions of the coating shielded by the photomask are dissolved away using a suitable solvent selected from among methyl isobutyl ketone, toluene, isopropyl alcohol, hexane, acetone or a mixture of any. A pattern corresponding to the photomask is formed in this way. After curing, the coating is heated preferably at 100 to 150° C. for 1 to 2 hours, whereby any volatiles including solvent left in the cured coating are volatilized off, yielding a cured coating having improved heat resistance, moisture resistance and adhesion.

Since the refractive index of the optical waveguide-forming material of the invention can be controlled merely by altering the proportion of organic groups introduced therein, especially the phenyl content in component (A) as mentioned above, it can be used as either a core layer-forming material or a clad layer-forming material provided that it is adjusted to an appropriate refractive index.

In the inventive optical waveguide, the refractive index difference value between the lower clad layer and the core layer defined as $\{(Rf_2-Rf_1)/Rf_2\} \times 100$ wherein $Rf_2$ is the refractive index of the core layer at 25° C. and $Rf_1$ is the refractive index of the lower clad layer at 25° C. is preferably 0.1 to 5% more preferably 0.2 to 3.5%.

The refractive index difference value between the upper clad layer and the core layer defined as $\{(Rf_2-Rf_3)/Rf_2\} \times 100$ wherein $Rf_2$ is the refractive index of the core layer at 25° C. and $Rf_3$ is the refractive index of the upper clad layer at 25° C. is also preferably 0.1 to 5%, more preferably 0.2 to 3.5%.

Using inventive materials having different contents of organic groups introduced, especially the phenyl content in component (A) to provide refractive indexes which differ a specific value from each other, the clad layer and the core layer can be formed respectively.

EXAMPLE

Examples and comparative examples are given below to illustrate the invention, and are not intended to limit the scope thereof. The average molecular weight is as measured by gel permeation chromatography (GPC) using a polystyrene standard, Mw is a weight average molecular weight, and $n_D$ is the refractive index of a polymer.

Example 1

A flask was charged with 56.2 parts by weight of acryloyloxypropyltriethoxysilane (i) and 182.4 parts by weight of phenyltrimethoxysilane (ii) in a molar ratio (i)/(ii) of 24/76. With stirring, a solution obtained by mixing 46.1 parts by weight of water with 7.2 parts by weight of oxalic acid dihydrate as an acid catalyst was added to the flask where hydrolytic reaction was effected at 25° C. The reaction mixture was then heated at 80° C. whereupon polycondensation reaction was carried out for 180 minutes while distilling off the alcohols as by-products.

The hydrolytic polycondensation product was dissolved in toluene, and acidic values were extracted therefrom with pure water until the extracting water became neutral. Thereafter, toluene was vacuum distilled off at 100° C./5 mmHg, yielding as resinous solids a (meth)acryloyloxy group-containing organopolysiloxane of the compositional formula (5) shown below. On analysis of this (meth)acryloyloxy group-containing organopolysiloxane, it had an average molecular weight (Mw) of 8,000 and $n_D$=1.530.

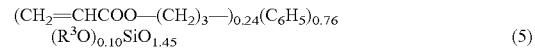

$$(CH_2=CHCOO-(CH_2)_3-)_{0.24}(C_6H_5)_{0.76} \\ (R^3O)_{0.10}SiO_{1.45} \qquad (5)$$

Herein, $R^3$ is a mixture of methyl, ethyl and hydrogen.

Next, 100 parts by weight of the (meth)acryloyloxy group-containing organopolysiloxane obtained above was dissolved in 20 parts by weight of toluene. To the solution was added 3 parts by weight of 2-hydroxy-2-methylpropiophenone. The solution was passed through a membrane filter having a pore size of 0.5 μm, obtaining a composition I-1 according to the invention. Composition I-1 was applied onto a silicon wafer by a spin coating technique, and dried for 10 minutes in a dryer at 80° C. The composition coating was tack-free in the uncured state.

Using a mask aligner, the composition coating was exposed to light in a dose of 400 mJ for curing. The coating was then washed with isopropyl alcohol, leaving a coating of the cured composition having a thickness of 25 μm on the silicon wafer (the coating becoming a clad layer). The substrate coated with the clad layer was dried at 100° C. for one hour.

Separately, a flask was charged with 93.6 parts by weight of acryloyloxypropyltriethoxysilane (i) and 384 parts by weight of phenyltrimethoxysilane (ii) in a molar ratio (i)/(ii) of 20/80. With stirring, a solution obtained by mixing 46.1 parts by weight of water with 7.2 parts by weight of oxalic acid dihydrate as an acid catalyst was added to the flask where hydrolytic reaction was effected at 25° C. The reaction mixture was then heated at 80° C. whereby polycondensation reaction was carried out for 180 minutes while distilling off the alcohols as by-products.

The hydrolytic polycondensation product was dissolved in toluene, and acidic values were extracted therefrom with pure water until the extracting water became neutral. Thereafter, toluene was vacuum distilled off at 100° C./5 mmHg, yielding as resinous solids a (meth)acryloyloxy group-containing organopolysiloxane of the compositional formula (6) shown below. On analysis of this (meth)acryloyloxy group-containing organopolysiloxane, it had an average molecular weight (Mw) of 8,000 and $n_D$=1.534.

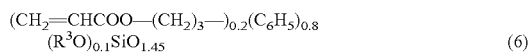

$$(CH_2=CHCOO-(CH_2)_3-)_{0.2}(C_6H_5)_{0.8}(R^3O)_{0.1}SiO_{1.45} \qquad (6)$$

Herein, $R^3$ is a mixture of methyl, ethyl and hydrogen.

Next, 100 parts by weight of the (meth)acryloyloxy group-containing organopolysiloxane obtained above was dissolved in 20 parts by weight of toluene. To the solution was added 3 parts by weight of 2-hydroxy-2-methylpropiophenone. The solution was passed through a membrane filter having a pore size of 0.5 µm, obtaining a composition II-1 according to the invention. Composition II-1 was applied onto the clad layer previously formed on the silicon wafer by a spin coating technique, and dried for 10 minutes in a dryer at 80° C. The composition coating was tack-free in the uncured state.

Using a mask aligner, a photomask which had been patterned in accordance with the desired optical waveguide was placed in close contact with the composition coating, which was exposed to light in a dose of 400 mJ for curing. Development with isopropyl alcohol yielded a pattern having a thickness of 40 µm and a resolution of 50 µm L/S on the clad layer (the pattern becoming a core layer). The substrate coated with the lower clad/core layer was dried at 100° C. for one hour.

On the lower clad/core layer, composition I-1 was applied again by a spin coating technique, and dried for 10 minutes in a dryer at 80° C. The overlay composition coating was tack-free in the uncured state.

Using a mask aligner, the composition coating was exposed to light in a dose of 400 mJ for curing. The coating was then washed with isopropyl alcohol, yielding an upper clad layer having a thickness of 70 µm on the lower clad/core layer (thickness being measured from the top of the lower clad layer). The optical waveguide thus obtained was dried at 100° C. for one hour.

The optical waveguide was evaluated for heat resistance and moisture resistance by the following tests.

Heat Resistance Test

The optical waveguide was heated for 500 hours in a dryer at 200° C. Neither separation from the substrate nor cracking was observed.

Moisture Resistance Test

Composition I or II was coated onto quartz glass and photo-cured into a film of 100 µm thick, which was held for 500 hours at a constant temperature and humidity of 85° C. and RH 85%. The treated film was measured for transmittance at a wavelength of 400 nm to 1,600 nm, finding the same results as before the treatment. That is, no change was introduced by moisture absorption.

Example 2

A flask was charged with 117 parts by weight of acryloyloxypropyltriethoxysilane (i) and 120 parts by weight of phenyltrimethoxysilane (ii) in a molar ratio (i)/(ii) of 50/50. With stirring, a solution obtained by mixing 46.1 parts by weight of water with 7.2 parts by weight of oxalic acid dihydrate as an acid catalyst was added to the flask where hydrolytic reaction was effected at 25° C. The reaction mixture was then heated at 80° C. whereupon polycondensation reaction was carried out for 180 minutes while distilling off the alcohols as by-products.

The hydrolytic polycondensation product was dissolved in toluene, and acidic values were extracted therefrom with pure water until the extracting water became neutral. Thereafter, toluene was vacuum distilled off at 100° C./5 mmHg, yielding as resinous solids a (meth)acryloyloxy group-containing organopolysiloxane of the compositional formula (7) shown below. On analysis of this (meth)acryloyloxy group-containing organopolysiloxane, it had an average molecular weight (Mw) of 10,000 and $n_D$=1.507.

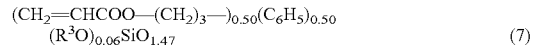

$$(CH_2=CHCOO-(CH_2)_3-)_{0.50}(C_6H_5)_{0.50}(R^3O)_{0.06}SiO_{1.47} \qquad (7)$$

Herein, $R^3$ is a mixture of methyl, ethyl and hydrogen.

Using the (meth)acryloyloxy group-containing organopolysiloxane obtained above, a composition I-2 was prepared as in Example 1.

Next, using composition I-2, a composition coating of 100 µm thick was formed on a silicon substrate and quartz glass as in Example 1. These coatings were examined by the heat resistance and moisture resistance tests of Example 1, finding no evidence for separation, cracking and a lowering of transmittance. Also using composition I-2, a patterned core layer could be formed by the same procedure as in Example 1. A pattern having a thickness of 40 µm and a resolution of 50 µm L/S was obtained.

Example 3

A flask was charged with 187 parts by weight of acryloyloxypropyltriethoxysilane (i) and 48 parts by weight of phenyltrimethoxysilane (ii) in a molar ratio (i)/(ii) of 80/20. With stirring, a solution obtained by mixing 46.1 parts by weight of water with 7.2 parts by weight of oxalic acid dihydrate as an acid catalyst was added to the flask where hydrolytic reaction was effected at 25° C. The reaction mixture was then heated at 80° C. whereupon polycondensation reaction was carried out for 180 minutes while distilling off the alcohols as by-products.

The hydrolytic polycondensation product was dissolved in toluene, and acidic values were extracted therefrom with pure water until the extracting water became neutral. Thereafter, toluene was vacuum distilled off at 100° C./5 mmHg, yielding as resinous solids a (meth)acryloyloxy group-containing organopolysiloxane of the compositional formula (8) shown below. On analysis of this (meth)acryloyloxy group-containing organopolysiloxane, it had an average molecular weight (Mw) of 9,000 and $n_D$=1.486.

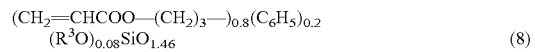

$$(CH_2=CHCOO-(CH_2)_3-)_{0.8}(C_6H_5)_{0.2}(R^3O)_{0.08}SiO_{1.46} \qquad (8)$$

Herein, $R^3$ is a mixture of methyl, ethyl and hydrogen.

Using the (meth)acryloyloxy group-containing organopolysiloxane obtained above, a composition I-3 was prepared as in Example 1.

Next, using composition I-3, a composition coating of 100 μm thick was formed on a silicon substrate and quartz glass as in Example 1. These coatings were examined by the heat resistance and moisture resistance tests of Example 1, finding no evidence for separation, cracking and a lowering of transmittance. Also using composition I-3, a patterned core layer could be formed by the same-procedure as in Example 1. A pattern having a thickness of 40 μm and a resolution of 50 μm L/S was obtained.

Comparative Example 1

A photo-curable organopolysiloxane was synthesized under the same conditions as in Example 1, aside from reducing the acid concentration to 1/20. The (meth)acryloyloxy group-containing organopolysiloxane thus obtained had the compositional formula (9) shown below. On analysis, it had an average molecular weight (Mw) of 800 and $n_D$=1.520.

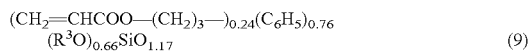
$$(CH_2=CHCOO-(CH_2)_3-)_{0.24}(C_6H_5)_{0.76} \\ (R^3O)_{0.66}SiO_{1.17} \tag{9}$$

Herein, $R^3$ is a mixture of methyl, ethyl and hydrogen.

Using the (meth)acryloyloxy group-containing organopolysiloxane obtained above, a composition I-4 was prepared as in Example 1. Using composition I-4, a clad layer of 25 μm thick was formed on a silicon substrate as in Example 1. In the 200° C. heat resistance test, this resin layer separated from the substrate and cracked.

Comparative Example 2

A thermosetting polysiloxane rubber primarily included a dimethylpolysiloxane capped with a dimethylvinylsiloxy group at each end of the molecular chain and having a viscosity of 1,000 cs at 25° C., a methylhydrogenpolysiloxane containing SiH groups on side chains and having a viscosity of 20 cs (in an amount to provide a ratio of SiH groups to vinyl groups in the vinyl-containing dimethylpolysiloxane=1.5 mol/mol), and a platinum catalyst. The polysiloxane rubber was applied onto quartz glass and heat cured to form a cured film of 100 μm thick, which was subjected to a moisture resistance test of holding for 500 hours at a constant temperature and humidity of 85° C. and RH 85%. The treated film was measured for transmittance at a wavelength of 400 nm to 1,600 nm, finding a lowering of transmittance near 1,000 nm, near 1,200 nm and 1,400–1,600 nm, probably due to moisture absorption.

The optical waveguide-forming material in the form of a photo-curable organopolysiloxane composition according to the invention is easy to prepare, low in the starting component cost, applicable to a substrate to form a coating which is less tacky in the uncured state, and good in sensitivity and resolution. It forms a thick-film coating having improved heat resistance, moisture resistance and adhesion to the substrate. The use of silicone resin enables to form a coating having better moisture resistance than silicone rubber and allows for easy adjustment of a refractive index. By utilizing the photo-curing ability of the inventive optical waveguide-forming material, the method is successful in manufacturing an optical waveguide in a simple, commercially advantageous manner without a need for dry etching step.

Japanese Patent Application No. 2002-029516 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An optical waveguide comprising a substrate, a lower clad layer on the substrate, a core layer on the lower clad layer and an upper clad layer on the core layer, at least one of the lower clad layer, the core layer and the upper clad layer is a cured product of a photo-curable organopolysiloxane composition comprising (A) a (meth)acryloyloxy group-containing organopolysiloxane of the following average compositional formula (1):

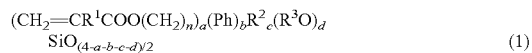
$$(CH_2=CR^1COO(CH_2)_n)_a(Ph)_bR^2_c(R^3O)_d \\ SiO_{(4-a-b-c-d)/2} \tag{1}$$

wherein $R^1$ is hydrogen or methyl, $R^2$ is an $C_1$–$C_8$ alkyl or $C_2$–$C_8$ alkenyl group, Ph is phenyl, $R^3$ is hydrogen or an unsubstituted or alkoxy-substituted $C_1$–$C_4$ alkyl group, subscripts a, b, c and d are numbers satisfying: $0.05 \leq a \leq 0.9$, $0.1 \leq b \leq 0.9$, $0 \leq c \leq 0.2$, $0 \leq d \leq 0.5$, and $0.8 \leq a+b+c+d \leq 1.5$, and n is an integer of 2 to 5, and having a weight average molecular weight of 1,000 to 100,000 as measured by GPC using a polystyrene standard, and (B) a photosensitizer.

2. The optical waveguide of claim 1 wherein each of the lower clad layer and the core layer is the cured product of the photo-curable organopolysiloxane composition.

3. The optical waveguide of claim 2 wherein the (meth) acryloyloxy group-containing organopolysiloxane (A) is obtained by subjecting to co-hydrolysis and polycondensation a (meth)acryloyloxyalkyltrialkoxysilane of the general formula (2):

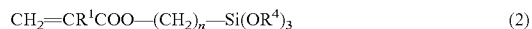
$$CH_2=CR^1COO-(CH_2)_n-Si(OR^4)_3 \tag{2}$$

wherein $R^1$ is hydrogen or methyl, $R^4$ is an unsubstituted or alkoxy-substituted alkyl group, and n is an integer of 2 to 5, 0.2 to 20 moles per mole of the silane of formula (2) of a phenyltrialkoxysilane of the general formula (3):

$$PhSi(OR^5)_3 \tag{3}$$

wherein Ph is phenyl and $R^5$ is an unsubstituted or alkoxy-substituted alkyl group, and 0 to 5 moles per mole of the silane of formula (2) of an organotrialkoxysilane of the general formula (4):

$$R^2Si(OR^6)_3 \tag{4}$$

wherein $R^2$ is an $C_1$–$C_8$ alkyl or $C_2$–$C_8$ alkenyl group and $R^6$ is an unsubstituted or alkoxy-substituted alkyl group.

4. The optical waveguide of claim 2 wherein the refractive index difference value of $\{(Rf_2-Rf_1)/Rf_2\} \times 100$ in which $Rf_2$ is the refractive index of the core layer at 25° C. and $Rf_1$ is the refractive index of the lower clad layer at 25° C. is in a range of from 0.1 to 5%.

5. The optical waveguide of claim 1 wherein each of the upper clad layer and the core layer is the cured product of the photo-curable organopolysiloxane composition.

6. The optical waveguide of claim 5 wherein the refractive index difference value of $\{(Rf_2-Rf_3)/Rf_2\} \times 100$ in which $Rf_2$ is the refractive index of the core layer at 25° C. and $Rf_3$ is the refractive index of the upper clad layer at 25° C. is in a range of from 0.1 to 5%.

7. The optical waveguide of claim 5 wherein each of the lower clad layer, the core layer and the upper layer is the cured product of the photo-curable organopolysiloxane.

8. The optical waveguide of claim 7 wherein the refractive index difference values of $\{(Rf_2-Rf_1)/Rf_2\} \times 100$ and $\{(Rf_2-Rf_3)/Rf_2\} \times 100$ in which $Rf_2$ is the refractive index of the core layer at 25° C., $Rf_1$ is the refractive index of the lower clad layer at 25° C. and $RF_3$ is the refractive index of the upper clad layer at 25° C. are a range of from 0.1 to 5%, respectively.

9. A method of preparing an optical waveguide comprising the steps of forming a lower clad layer on a substrate, forming a core layer on the lower clad layer, and forming an upper clad layer on the core layer so that at least one of the lower clad layer, the core layer and the upper clad layer is formed by irradiating light to a photo-curable organopolysiloxane composition comprising
(A) a (meth)acryloyloxy group-containing organopolysiloxane of the following average compositional formula (1):

$$(CH_2CR^1COO(CH_2)_n)_a(Ph)_bR^2_c(R^3O)_d SiO_{(4-a-b-c-d)/2} \quad (1)$$

wherein $R^1$ is hydrogen or methyl, $R^2$ is an $C_1$–$C_8$ alkyl or $C_2$–$C_8$ alkenyl group, Ph is phenyl, $R^3$ is hydrogen or an unsubstituted or alkoxy-substituted $C_1$–$C_4$ alkyl group, subscripts a, b, c and d are numbers satisfying: $0.05 \leq a \leq 0.9$, $0.1 \leq b \leq 0.9$, $0 \leq c \leq 0.2$, $0 \leq d \leq 0.5$, and $0.8 \leq a+b+c+d \leq 1.5$, and n is an integer of 2 to 5, and having a weight average molecular weight of 1,000 to 100,000 as measured by GPC using a polystyrene standard, and
(B) a photosensitizer,
thereby forming a cured product.

10. The method of preparing the optical waveguide of claim 9 wherein the (meth)acryloyloxy group-containing organopolysiloxane (A) is obtained by subjecting to cohydrolysis and polycondensation a (meth)acryloyloxyalkyltrialkoxysilane of the general formula (2):

$$CH_2=CR^1COO-(CH_2)_n-Si(OR^4)_3 \quad (2)$$

wherein $R^1$ is hydrogen or methyl, $R^4$ is an unsubstituted or alkoxy-substituted alkyl group, and n is an integer of 2 to 5, 0.2 to 20 moles per mole of the silane of formula (2) of a phenyltrialkoxysilane of the general formula (3):

$$PhSi(OR^5)_3 \quad (3)$$

wherein Ph is phenyl and $R^5$ is an unsubstituted or alkoxy-substituted alkyl group, and 0 to 5 moles per mole of the silane of formula (2) of an organotrialkoxysilane of the general formula (4):

$$R^2Si(OR^6)_3 \quad (4)$$

wherein $R^2$ is an $C_1$–$C_8$ alkyl or $C_2$–$C_8$ alkenyl group and $R^6$ is an unsubstituted or alkoxy-substituted alkyl group.

11. The method of preparing the optical waveguide of claim 9 wherein the lower clad layer and the core layer are formed from the photo-curable organopolysiloxane composition.

12. The method of preparing the optical waveguide of claim 11 wherein the refractive index difference value of $\{(Rf_2-Rf_1)/Rf_2\} \times 100$ in which $Rf_2$ is the refractive index of the core layer at 25° C. and $Rf_1$ is the refractive index of the lower clad layer at 25° C. is controlled in a range of from 0.1 to 5% by controlling the phenyl content in component (A).

13. The method of preparing the optical waveguide of claim 9 wherein the upper clad layer and the core layer are formed from the photo-curable organopolysiloxane composition.

14. The method of preparing the optical waveguide of claim 13 wherein the refractive index difference value of $\{(Rf_2-Rf_3)/Rf_2\} \times 100$ in which $Rf_2$ is the refractive index of the core layer at 25° C. and $Rf_3$ is the refractive index of the upper clad layer at 25° C. is controlled in a range of from 0.1 to 5% by controlling the phenyl content in component (A).

15. The method of preparing the optical waveguide of claim 9 wherein the lower clad layer, the core layer and the upper layer all are formed from the photo-curable organopolysiloxane.

16. The method of preparing the optical waveguide of claim 15 wherein the refractive index difference values of $\{(Rf_2-Rf_1)/Rf_2\} \times 100$ and $\{(Rf_2-Rf_3)/Rf_2\} \times 100$ in which $Rf_2$ is the refractive index of the core layer at 25° C., $Rf_1$ is the refractive index of the lower clad layer at 25° C. and $Rf_3$ is the refractive index of the upper clad layer at 25° C. is controlled in a range of from 0.1 to 5% by controlling the phenyl content in component (A).

17. The optical waveguide of claim 2 wherein each of the lower clad layer, the core layer, and the upper clad layer is the cured product of the photo-curable organopolysiloxane.

18. The optical waveguide of claim 1 wherein the subscript d in the average compositional formula (1) is in the range of $0.01 \leq d \leq 0.5$ and the weight average molecular width of the (meth)acryloyloxy group-containing organopolysiloxane is in the range of 5000 to 100,000 as measured by GPC using a polystyrene standard.

19. The method of preparing the optical waveguide of claim 9 wherein the subscript d in the average compositional formula (1) is in the range of $0.01 \leq d \leq 0.5$ and the weight average molecular width of the (meth)acryloyloxy group-containing organopolysiloxane is in the range of 5000 to 100,000 as measured by GPC using a polystyrene standard.

* * * * *